United States Patent

[11] 3,603,179

| [72] | Inventors | Hans-Peter Stihl<br>Hochberg, near Ludwigsburg;<br>Hans Dolata, Neustadt, near Waiblingen;<br>Rolf Sauermilch, Waiblingen; Herman<br>Lude, Stetten, near Waiblingen, all of,<br>Germany |
|---|---|---|
| [21] | Appl. No. | 792,341 |
| [22] | Filed | Jan. 21, 1969 |
| [45] | Patented | Sept. 7, 1971 |
| [73] | Assignee | Andreas Stihl Maschinenfabrik<br>Neustadt-Waiblingen, Germany |
| [32] | Priority | Jan. 20, 1968 |
| [33] | | Germany |
| [31] | | P 16 52 787.0 |

[54] APPARATUS FOR SHARPENING SAW CHAINS OF MOTOR CHAIN SAWS
31 Claims, 14 Drawing Figs.

[52] U.S. Cl. ................................................ 76/25 A, 51/150, 51/370, 76/37
[51] Int. Cl. ............................................... B23d 63/00
[50] Field of Search ......................................... 76/25 A, 37; 51/370, 358, 363, 150

[56] References Cited
UNITED STATES PATENTS

| 1,250,085 | 12/1917 | Bocking | 51/150 |
| 3,147,644 | 9/1964 | Oehrli | 76/37 |
| 3,361,012 | 1/1968 | Fullerton | 76/25 |
| 3,465,617 | 9/1969 | Silvon | 76/25 |

Primary Examiner—Bernard Stickney
Attorney—Walter Becker

ABSTRACT: For use in connection with a motor chain saw having a driving sprocket wheel and a saw chain adapted to pass over and be driven by said sprocket wheel, an apparatus for sharpening said saw chain, which comprises: holding means including means for connection to a motor chain saw, the saw chain of which is to be sharpened, said holding means having a concave surface portion for receiving abrasive means, and biasing means associated with said holding means for biasing said concave surface portion in the direction toward the center of curvature of said concave surface portion.

Inventors:
Hans-Peter Stihl
Hans Dolata
Rolf Sauermilch
Hermann Lude
By

Inventors:
Hans-Peter Stihl
Hans Dolata
Rolf Sauermilch
Hermann Lude
By Walter Becker

Fig. 14

APPARATUS FOR SHARPENING SAW CHAINS OF MOTOR CHAIN SAWS

The present invention relates to a sharpening device for saw chains of motor chain saws with a holding device for a correspondingly curved grinding body which is located within the region of a driving sprocket wheel and which is mounted on the motor chain saw so as to be able substantially radially to move with regard to the driving sprocket wheel.

Sharpening or grinding devices are known which are built into motor saws and serve for automatically sharpening the saw chain. The grinding body is along guiding means moved substantially radially with regard to the driving chain sprocket while the grinding body in its respective adjustment is held radially rigidly with regard to the driving sprocket wheel so that damage to the saw chain and to the grinding body may occur if the feeding is effected in an improper manner. Inasmuch as with heretofore known grinding devices grinding stones are employed as grinding bodies, it is necessary for obtaining a uniform wear that the grinding stone is during the grinding operation moved back and forth in an axis-parallel manner with regard to the driving chain sprocket. This axial reciprocatory movement of the grinding stone is effected by the operator by hand so that in spite of the axial movability an uneven wear of the grinding stone may be caused by nonuniform movements whereby a unilateral grinding of the saw chain is effected. This brings about the drawback that the saw chain cuts only unilaterally with all the drawbacks inherent thereto. Furthermore, with heretofore-known grinding devices, it is disadvantageous that the operator can hold the motor saw with one hand only since his other hand is required for operating the grinding device. This results in many accidents.

Furthermore, with heretofore-known grinding devices it is disadvantageous that the grinding stone or disc during the cutting of the motor chain saw remains on the latter so that the grinding disc is soiled by resin, sawdust, chain-lubricating oil, or the like, whereby the grinding properties are harmfully affected.

It is, therefore, an object of the present invention to provide a sharpening device of the above-mentioned type which will overcome the above-mentioned drawbacks.

It is another object of this invention to provide a grinding device of the above-mentioned general character which will assure a simple operation and will avoid damage to the saw chain and the grinding body by an improper feeding of the latter.

It is also an object of this invention to provide a grinding device as set forth in the preceding paragraphs, in which the grinding body during the sharpening of the saw chain will be at a standstill in an axis-parallel manner with regard to the driving chain sprocket, especially so that the operator will be able during the sharpening of the saw chain to hold the motor chain saw with both hands.

Still another object of this invention consists in so designing a grinding device of the above-mentioned type that the grinding body will not be soiled by the cutting with the motor chain saw.

Finally, it is an object of this invention so to design a grinding device of the above-mentioned character that it will be simple in construction and operation.

These and other objects and advantages of the invention will appear more clearly from the following specification in connection with the accompanying drawings, in which.

The grinding device for saw chains of motor chain saws which is provided with a holding device for a correspondingly curved grinding body is, in conformity with the present invention, characterized primarily in that the grinding body is spring-urged toward the driving sprocket wheel. In this way the grinding body will automatically at a constant grinding pressure feed itself up to a predetermined end pressure so that damage to the saw chain and/or the grinding body, for instance by too high feeding forces, of the grinding body will be avoided.

According to a particularly advantageous embodiment of the invention, the grinding body preferably formed by an easily detachable grinding foil, such as grinding paper or a synthetic fiber foil, with a grinding layer is fixedly arranged on a holding device which latter is spring-urged toward the driving chain wheel. By employing a grinding foil, the advantage is obtained that a movement of the grinding body in axis-parallel direction toward the driving chain wheel is no longer necessary during the grinding of the saw because the grinding foil may, for instance after two or three grinding operations, be exchanged and therefore cannot be worn unilaterally. As a result thereof, the operator is able during the grinding of the saw chain, to hold the motor chain saw with both hands, so that the danger of accidents will be considerably reduced.

The grinding foil can in a very simple manner parallel to the direction of the axis of the driving chain wheel or parallel to the tilting axis of the holding device be introduced into the latter from the side when a slot extends in the circumferential direction of the driving chain wheel. Preferably, both sides of the grinding foil which extend transverse to the circumferential direction of the driving sprocket wheel are provided with a transverse slot each.

The grinding device according to the present invention may further be materially improved by limiting the tilting stroke of the holding device toward the driving chain wheel by a preferably adjustable abutment so that the feeding of the grinding body during the grinding operation of the saw chain will automatically when the respective desired grinding depth has been reached be stopped. The abutment may in a simple manner be formed by a nut, such as a knurled nut which is guided on a threaded spindle which is coaxial with regard to the helical pressure spring and is connected to the holding device. The said nut has associated therewith as counter abutment a fishplate or the like which preferably is provided with an opening for the passage therethrough of the spindle. In this way, the adjusting spindle is safely guided.

According to another embodiment of the invention, the holding device is by means of a helical torsion spring located in the tilting axis of the holding device under a spring load which requires little space. Expediently, the helical torsion spring has one end connected to a bearing sleeve carrying the holding device while the other end is connected to the holding device. Between the bearing sleeve which is rotatably mounted relative to the motor chain saw and the motor chain saw there is provided at least one detachable ratchet member for a predetermined rotary position of the bearing sleeve. This makes it possible in a very simple manner to adjust and set the spring force at which the holding arm is urged toward the driving sprocket wheel, inasmuch as this adjustment may be effected merely by turning the bearing sleeve. The detachable ratchet or latching member may be formed by a locking bolt or the like which is displaceably mounted on the motor chain saw, preferably for axis-parallel movement with regard to the bearing sleeve. The said latching bolt is spring-urged toward said bearing sleeve and has associated therewith a locking opening on the bearing sleeve. A particularly advantageous further development of the invention consists in that the grinding device is easily detachably connected to the motor chain saw, preferably to a sprocket wheel cover of the saw housing. This makes it possible, following the completion of a grinding operation of the saw chain, to remove the grinding device so that a soiling of the latter and in particular of the grinding body will be avoided during the operation of the motor chain saw.

The grinding or sharpening of the motor chain saw will thus be effected in the following manner: First the grinding device will be mounted on the motor chain saw while the motor is at a standstill. Thereupon the abutment for the holding device of the grinding body is set in conformity with the desired grinding depth. Subsequently, the motor of the motor chain saw is started whereupon the motor chain saw during the sharpening of the saw chain may be held with both hands. The grinding operation takes about from 30 seconds to 1 minute. An actuation of the grinding body or the holding device during the sharpening operation is not necessary. Following the sharpening operation, the grinding device will, after the motor has been stopped, be removed from the motor chain saw. The grinding body or the grinding foil may easily be exchanged after the grinding device has been removed. The grinding foil advantageously has a thickness of from 0.5 to 0.8 millimeters whereas the grinding layer or cover on the grinding foil has a thickness of from 0.2 to 0.3 millimeters.

For safely mounting the holding device, the pivot bearing for the latter is advantageously provided on a bearing bracket which by at least one clamping screw and at least one centering pin is aligned with and connected to the motor chain saw in such a way that the location of the pivot axis is precisely set. Advantageously, the bearing bracket is provided with a counter abutment for the holding device whereby an easy adjustment of the abutment will be possible.

According to a preferred embodiment of the invention, the clamping screw is axis-parallel with regard to the pivot axis. In order to be able in a short time to connect the bearing bracket to the motor chain saw or to remove the bearing bracket therefrom, the clamping screw has on the saw chain associated therewith a receiving slot open at its marginal area. On one side of said housing there rests the bearing bracket, and on the other side of the housing, preferably on the outside of said housing, there rests a nut which is guided on said clamping screw. After the clamping screw has been introduced into the receiving slot, the nut is tightened so that the bearing bracket and thereby the sharpening device are safely held.

The construction of the sharpening device according to the invention may further be simplified by locating the clamping screw in the tilting axis of the holding device and by forming said clamping screw preferably as one piece with the pivot-bearing bolt.

Referring now to the drawings in detail, and FIGS. 1 to 6 thereof in particular, the arrangement shown therein comprises a grinding or sharpening device which is mounted on a bearing bracket 1 which has connected thereto a stud or bolt 2. That end of the bolt 2 which protrudes beyond the bearing bracket 1 has arranged thereon a clamping screw 3 which acts as connecting nut. The clamping screw 3 is by means of a thread guided on said protruding end of the stud 2. The clamping nut 3 is by means of a safety ring 4 prevented from accidentally leaving the bolt 2. The bolt 2 at the lower widened marginal area 5 of the sprocket wheel cover 6 of a motor chain saw 7 has associated therewith a slot 8 of corresponding width which is open at its downwardly extending marginal area. The bolt 2 is adapted from below to be introduced into the said slot in such a way that the bearing bracket 1 engages the inner side of the widened marginal area 5 of the chain wheel cover 6 while the clamping nut 3 engages the outside of said cover 6. By tightening the clamping nut 3 which may be designed as a knurled nut, the bearing bracket 1 is tightened with regard to the chain wheel cover 6. The bearing bracket 1 has provided thereon two centering pins 9 which are located on both sides of the stud 2 and which have associated therewith corresponding centering recesses 10 in the widened marginal area 5 of the chain wheel cover 6. By means of the centering pins 9 located in the centering recesses 10, the bearing block 1 when in assembled condition will occupy a precisely predetermined position with regard to the sprocket wheel cover 6 and thereby with regard to the motor chain saw. A pivot-bearing bolt 13 is, for instance, by press fit connected to a portion 12 of the bearing bracket 1, which portion is offset with regard to the part 11 carrying the screw 2 and is axis-parallel to said screw 2 while being located therebelow. Pivotally mounted on that portion of the bearing bolt 13 which protrudes beyond the bearing bracket 1 is a holding arm 14 with a hub 15. The holding arm 14 is curved in conformity with the grinding surface and preferably has a rectangular cross section. As will be seen from the drawings, the holding arm 14 is substantially angle-shaped while the end section of the arm 16 facing away from the pivot bearing bolt 13 is semicircularly shaped in such a way that this semicircular section 17 of the holding arm 14 is adapted when the sharpening device is mounted on the motor chain saw 7, to be moved into a position which is coaxial with the driving sprocket wheel 18 of the motor chain saw for the saw chain 19. The holding arm 14 is secured by a safety ring 20 against accidental axial displacement of the pivot-bearing bolt 13.

The above-outlined arrangement yields a grinding-device structure which is light in weight. For journaling the holding arm 14 in a simple manner, at least one of its ends is rectilinear. By the rectilinear design of at least one end of the holding arm, it will also be obtained that the saw chain will easily move into the grinding range without the danger that the grinding foil will at its marginal areas be torn by the saw chain. Advantageously, that section of the holding arm which is adjacent the curved portion toward the pivot-bearing extends approximately radially with regard to the driving sprocket wheel. This section may be provided for the arrangement of the clamping device for the grinding foil.

With further reference to the drawings, it will be noted that on a lateral extension of that leg 16 of the holding arm 14 which faces away from the pivot axis of the arm 14 there is connected a stud or bolt 22 which extends preferably about vertically with regard to the direction of the axis of the pivot-bearing bolt 13 and protrudes downwardly beyond the extension 21. The screw 22 which is formed by a threaded spindle is by means of a corresponding bore guided in a plate 23 of the bearing bracket 1 which plate is approximately rectangular to said bore. The said spindle 22 is on that side of the plate 23 which faces away from the extension 21 provided with an abutment nut 24 formed by a knurled nut. Between the plate 23 and the extension 21 there is arranged a helical pressure spring 25 which surrounds the screw 22. This spring 25 which rests on one hand on the plate 23 and on the other hand on the extension 21 and thereby on the holding arm 14, in such a way that the said holding arm 14 is, with regard to FIG. 1, spring-urged for rotation in clockwise direction toward the driving sprocket wheel 18 of the motor chain saw 7. The end position of the holding arm 14 which is located toward the driving sprocket wheel 18 is limited by the abutment nut 24 which has one end face in engagement with the corresponding surface of the plate 23.

The curved section 17 on the holding arm 14 which extends over an angle of approximately 90° has that side thereof which faces the driving sprocket wheel 18 designed for connection of a strip-shaped grinding foil 26. To this end, both sides of the holding arm which are approximately rectangular with regard to the pivot axis 13 have by means of rivets 28 angle plates 27 connected thereto. One leg 29 each of each angle plate 27 extends over the concavely curved surface of the holding arm 14 in spaced relationship thereto in such a way that at both marginal areas of the curved section 17 of the holding arm 14 there are formed two oppositely located slots 30. One sidewall of said slot is formed by the curved surface 31 of the holding arm 14. It is into these oppositely located slots 13 that the grinding foil 26 is inserted in circumferential direction of the arrow 32 from the free end of the holding arm 14 or the curved section 17. The guiding plates 27 approximately extend over the entire curved portion 17 of the holding arm 14.

As will be evident from the above, in this way the grinding foil is safely held, can be detached without difficulties whenever desired and can easily laterally be introduced into the holding means.

On that side of the radially extending portion of one leg 16 of the holding arm 14 which faces the pivot-bearing bolt 13 there is provided a clamping nut 33 which is designed as a knurled nut. Nut 33 is guided on a threaded screw 34 which is connected to the holding arm 14 and extends perpendicularly with regard to the plane of the grinding foil 26. That end face of the nut 33 which faces the holding arm 14 engages a spring plate 35 parallel to the end face. Between the spring plate 35 and that surface of the holding arm 14 which faces said plate 35, one end of the grinding foil 26 is inserted and is clamped fast by tightening the nut 33. This rectilinearly extending clamped portion 36 of the grinding foil 26 merges through a convexly curved section 37 with the concavely curved section so that the saw chain 19 moving in the direction of the arrow 38 will be able without damage to the grinding foil 26 to move into the grinding zone.

The holding arm 14 is with regard to the sprocket drive wheel 18 so arranged that the curved portion of the grinding foil 26 which extends over an angle of 90° at least approximately over its entire circumferential extension can be brought into engagement with the saw chain 19 moving over the wheel 18. The curved portion of the grinding foil 26 is located on that side of the wheel 18 which faces away from the guiding rail (not shown) of the motor chain saw 7.

For grinding the saw chain, the bearing bracket 1 is in the manner described above, connected to the chain wheel cover 6 whereupon the abutment nut 24 is adjusted in conformity with the predetermined grinding depth. Thereupon, the saw chain 19 is rotated through the intervention of the sprocket wheel 18 while the grinding foil 26 by means of the holding arm 14 is placed against the saw chain 19. The cutting teeth of the saw chain 19 are now being ground while the grinding foil 26 will engage the cutting teeth at substantially constant spring pressure until the abutment nut 24 by means of its corresponding end face engages the plate 23 of the bearing bracket 1. The nut 24 is located at the bottom side of the bearing bracket 1 within the area of the open side of the chain wheel cover 6 so that the nut 24 is easily accessible. After completion of the grinding operation, the grinding device is again withdrawn from the motor chain saw.

According to the embodiment illustrated in FIGS. 7 to 12, the pivot-bearing bolts 13a for the holding arm 14a and the clamping screw 2a form one piece in such a way that the clamping screw 2a is located in the pivot axis of the holding arm 14a. The bearing bracket 1a is merely on that side of the connecting screw 2a which faces the abutment plate 23a provided with a centering pin 9a which engages a corresponding centering opening 10a of the reinforced marginal area 5 of the cover 6. The hub 15a of the holding arm 14a is mounted between two safety rings 20a, 39 so as to be axially nondisplaceable on the bolt 13a. One of said safety rings namely 39 forms a spacer ring between the bearing bracket 1a and the hub 15a and on the other hand serves as counter bearing for the clamping nut 3a which is arranged on the connecting screw 2a.

According to the embodiment illustrated in FIGS. 7 to 12, the holding arm 14a extends approximately radially from the bolt 13a toward the rear while the portion extending radially directly merges with the curved section 17a of the holding arm 14a. The free end of the holding arm 14a is in its turn designed rectilinearly so that on one side there is obtained an inlet inclined to the grinding foil 26a while on the other side there is obtained an outlet for the saw chain 19 which is inclined to the grinding foil 26a. The extension 21a for connecting the threaded spindle 22a is provided on the rectilinear portion of the holding arm 14a which portion extends toward the bolt 13a. The engaging plate 23a is approximately parallel to the said part so that very small dimensions are obtained.

Figure 1:
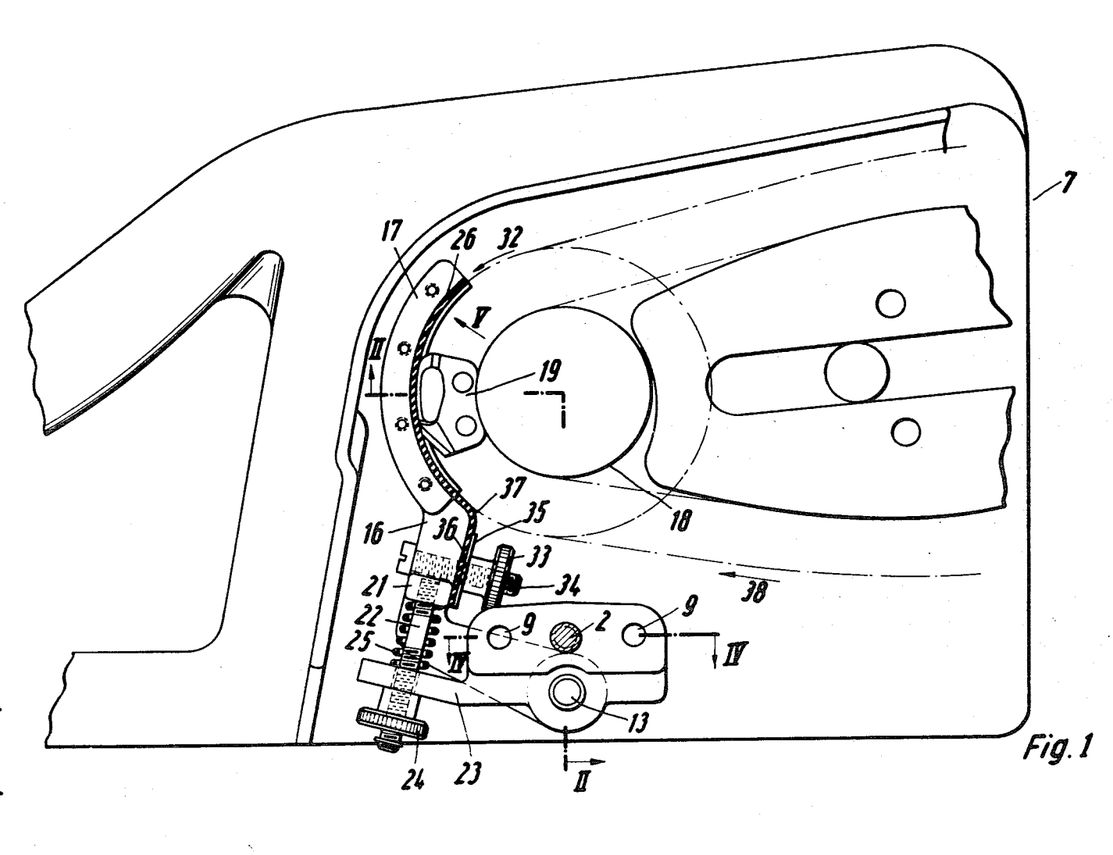
FIG. 1 diagrammatically illustrates a side view of a sharpening device according to the invention mounted on a motor chain saw.
Figure 2:
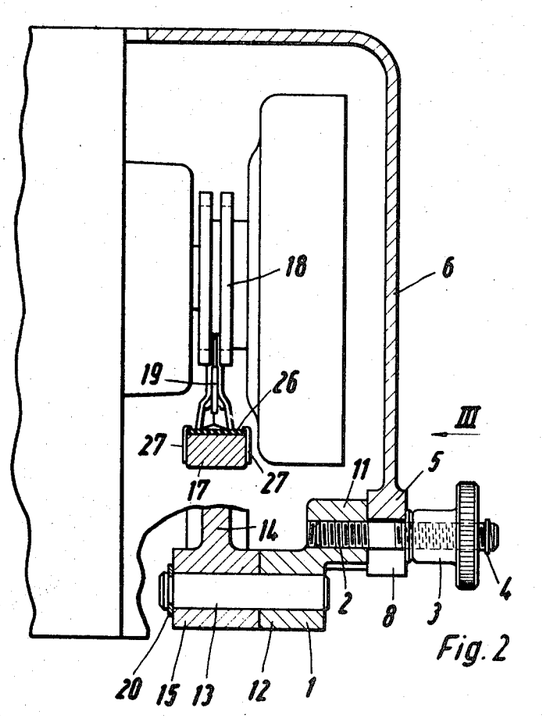
FIG. 2 is a section taken along the line II—II of FIG. 1.
Figures 3, 4, 5, 6:
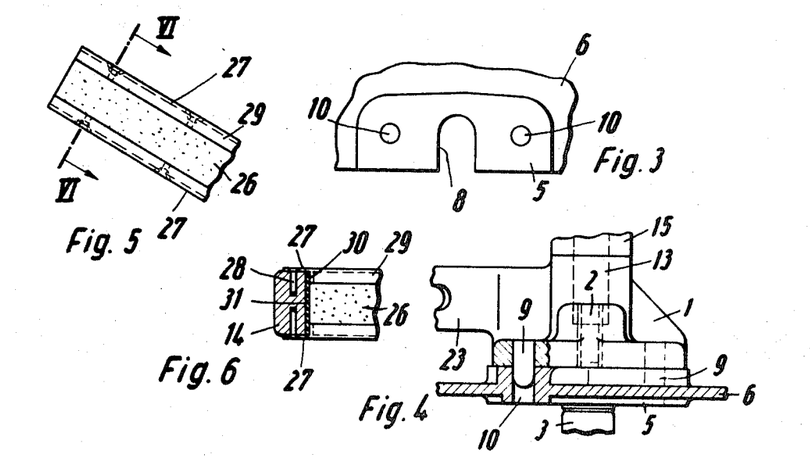
FIG. 3 represents a view of a cutout as seen in the direction of the arrow III of FIG. 2.
FIG. 4 is a section taken along the line IV—IV of FIG. 1.
FIG. 5 represents a view of a cutout as seen in the direction of the arrow V of FIG. 1.
FIG. 6 is a section taken along the line VI—VI of FIG. 5.
Figure 7:
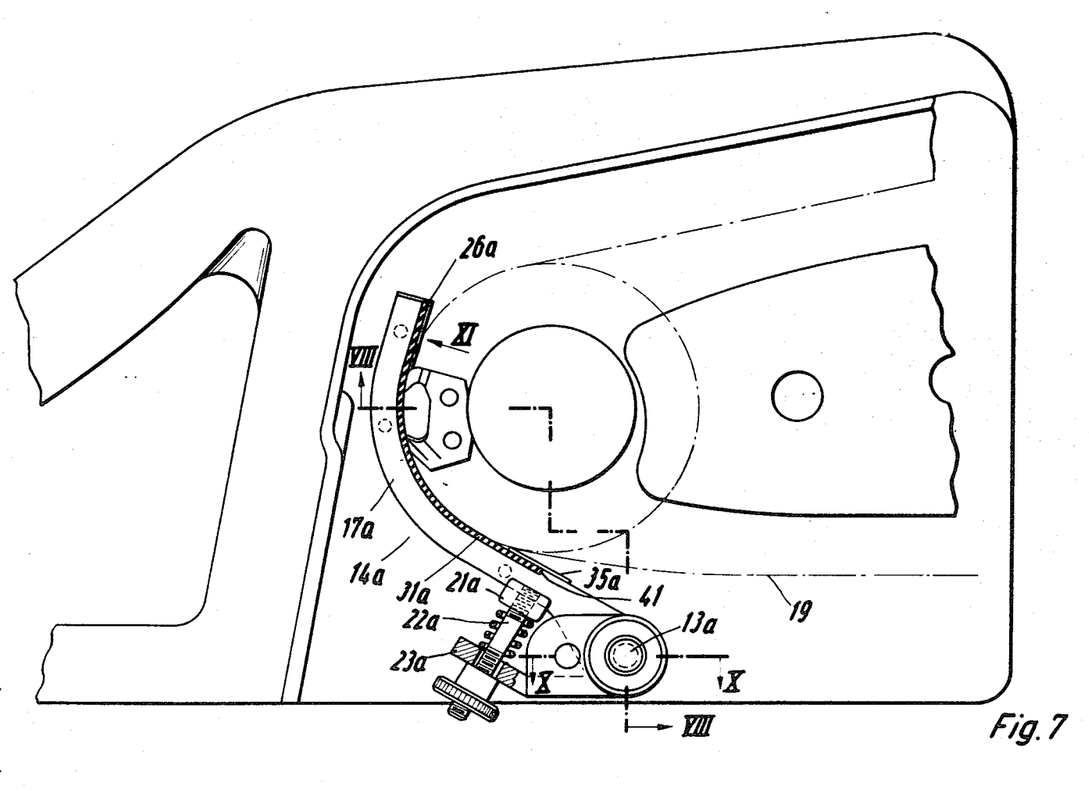
FIGS. 7 to 12 diagrammatically illustrate a further development of a sharpening device according to the invention in a representation similar to that of FIGS. 1 to 6.
Figure 8:
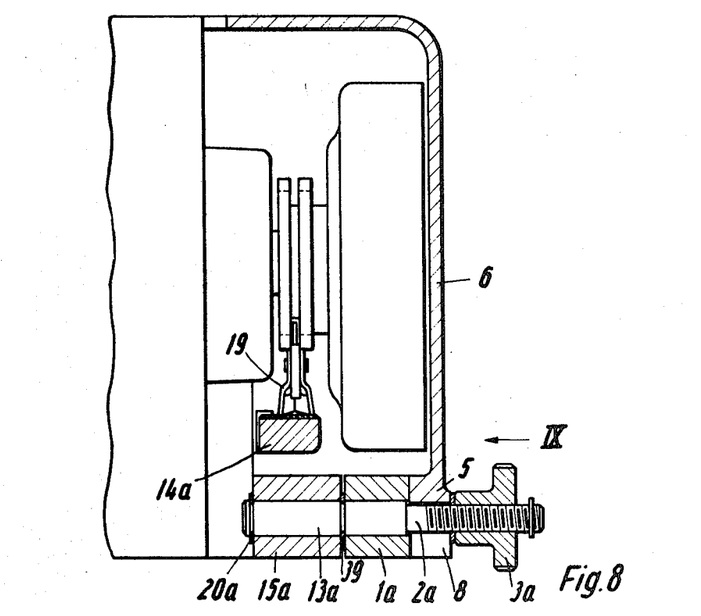
Figure 9:
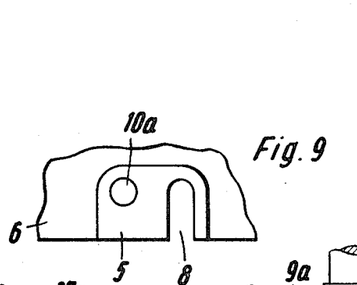
Figure 10:
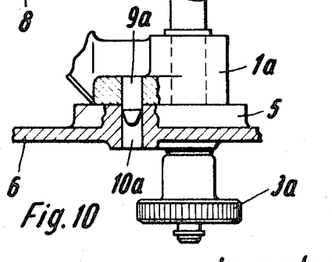
Figure 11:
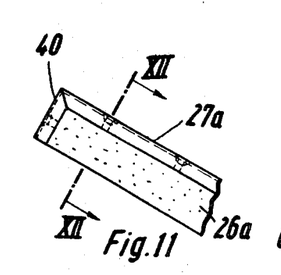
Figure 12:
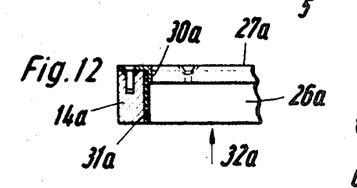

As will be seen from FIGS. 7, 8, 11 and 12, with this embodiment, the holding arm 14a has an angle plate 27a only on one lateral edge extending in circumferential direction. That end of the angle plate 27a which is adjacent the free end of the holding arm 14a is provided with a corresponding angular transverse plate 40 connected by means of rivets. This plate 40 forms a receiving slot for one narrow side of the grinding foil 26a. At that end of the angle plate 27a which is located adjacent the bolt 23a, the supporting surface 31a for the grinding foil 26a is limited by a protruding transverse edge over which extends a spring plate 35a. With this embodiment of the invention, the grinding foil 26a may be introduced parallel to the longitudinal direction of the bolt 13a in the direction of the arrow 32a (FIG. 12). This introduction into the receiving slots 30a formed by the angle plates 27a and the spring plate 35a can be effected in a very simple manner.

By means of the transverse plate 40 and/or the transverse edge 41 abutments are formed for the grinding foil 26 by means of which the grinding foil 26 will be prevented from displacement with regard to the holding arm 14a by the saw chain 19 engaging said grinding foil 26a.

Figure 13:
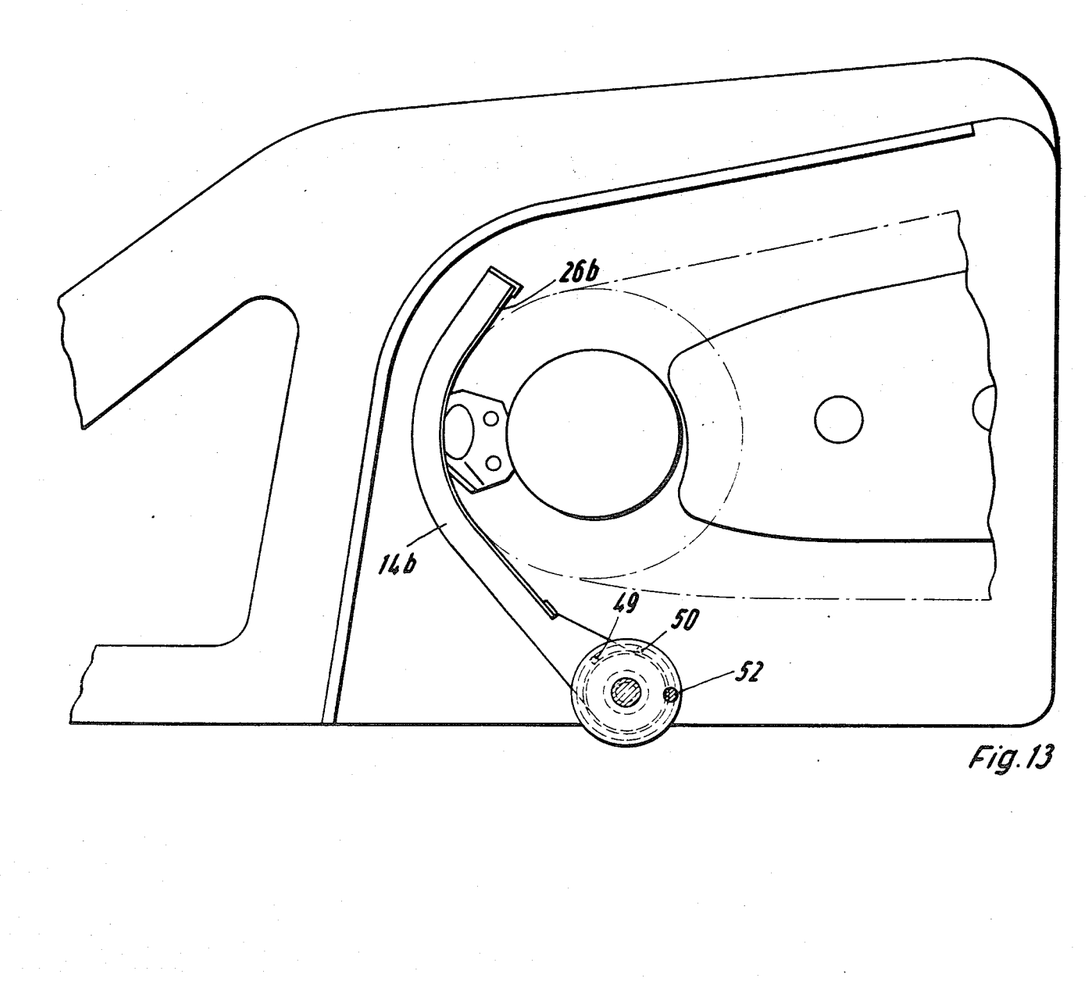
FIGS. 13 and 14 illustrate a further embodiment of the invention respectively showing similar representations as FIGS. 1 and 2.
Figure 14:
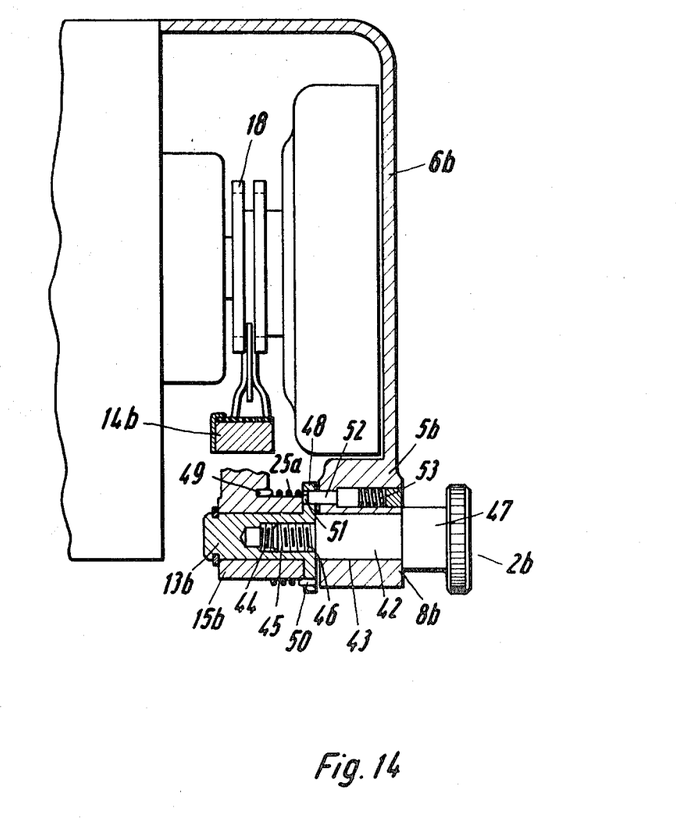

According to the embodiment of FIGS. 13 and 14, the holding arm 14b for the grinding foil 26b is designed similar to the holding arm 14a in FIG. 7. The connecting screw 2b for connecting the grinding device to the sprocket wheel cover 6b has a rotary bolt 42 which latter has associated therewith a corresponding bearing bore 43 in the reinforced marginal area 5b of the sprocket wheel cover 6b. This bore 43 is located in an axis-parallel manner with regard to the sprocket wheel 18 and below the latter. The pivot-bearing bolt 13b for the hub 15b of the holding arm 14b is formed by a bearing sleeve which has one end face thereof provided with a coaxial inner thread 44. This inner thread 44 has associated therewith a corresponding threaded stud 45 which is adjacent to the pivot bolt 42 of the connecting screw 2b. The threaded stud 45 has a smaller diameter than the pivot bolt 42 so that end face of the bolt 42 which faces the threaded stud 45 forms an annular abutment shoulder. On that side of the pivot bolt 42 which faces away from the bearing sleeve 13b, the connecting screw 2b is provided with a collar 47 which has a larger diameter than the bolt 42. The axial extension of the pivot bolt 42 is slightly larger than the corresponding extension of the reinforced marginal area 5b of the cover 6b. The bearing sleeve 13b has that side thereof which faces the reinforced marginal area 5b of the cover 6b provided with an annular collar 48 which has a larger diameter than the hub 15b. Between the collar 48 and the hub 15b there is arranged a helical torsion spring 25a extending around the hub 15b. This spring 25a has one end 49 connected to the hub 15b and has its other end 50 connected to the annular collar 48 of the bearing sleeve 13b. The collar 48 of the sleeve 13b has at least one locking opening 51 cooperating with a locking pin 52 which is displaceable in an axis-parallel manner with regard to the bearing sleeve 13b in a corresponding bore of the reinforced marginal area 5b of the cover 6b and is spring-urged toward the collar 48 by means of a pressure spring 53.

For purposes of mounting the grinding device according to FIGS. 13 and 14, the grinding arm with the bearing sleeve 13b is placed into engagement with the inner side of the reinforced marginal area 5b of the cover 6b. Thereupon, the connecting screw 2b which has its outer side provided with a knurled head is placed into the bearing bore 43 and by means of the threaded stud 45 is screwed into the interior thread 44 of the bearing sleeve 13b. When the annular surface 46 of the connecting screw 2b abuts the corresponding end surface of the bearing sleeve 13b, the latter will likewise be turned when the connecting screw 2b is turned further so that the helical torsion spring or leg spring 25a is preloaded. After a turning angle of approximately 90°, the locking recess 51 moves into the region of the bolt 52 so that the latter springs into the recess 51, and the bearing sleeve 13b is fixed relative to the cover 6b. As a result thereof, the spring 25a is retained in its preloaded condition so that the grinding arm 14b in view of the thrust of the preloaded spring 25a can be brought into engagement with the saw chain to be ground.

Due to the fact that by the embodiments according to FIGS. 7 to 14 the holding arm 14a, 14b has only on one side thereof provided an angle plate 27a, the grinding foil 26a, 26b can be used over a relatively great width so that the holding arm 14a, 14b may be designed of a relatively narrow width.

It is, of course, to be understood that the present invention is, by no means, limited to the particular showing in the drawings but also comprises any modifications within the scope of the appended claims.

What we claim is:

1. For use in connection with a motor chain saw having a driving sprocket wheel and a saw chain adapted to pass over and be driven by said sprocket wheel, an apparatus for sharpening said saw chain, which comprises: holding means including means for connection to a motor chain saw the saw chain of which is to be sharpened accurately with uniform pressure, said holding means having a concave surface portion for receiving abrasive means, and biasing means associated with said holding means for biasing said concave surface portion always in the direction toward the center of curvature of said concave surface portion.

2. An apparatus according to claim 1, which includes abrasive foil means for lightweight portability and detachably but firmly connected to said holding means.

3. An apparatus according to claim 2, which includes guiding means associated with said holding means for slidably receiving said abrasive foil means.

4. An apparatus according to claim 3, in which said guiding means includes slot means for receiving at least one marginal area of said abrasive foil means.

5. An apparatus according to claim 2, which includes manually operable clamping means associated with said holding means for connecting said abrasive foil means to said holding means.

6. An apparatus according to claim 5, in which said clamping means includes a biased spring plate.

7. An apparatus according to claim 4, in which said slot means consists of groove forming means forming an integral part of said holding means.

8. An apparatus according to claim 4, in which said slot means are formed by rail means of angle-shaped contour connected to said holding means and extending over the marginal area of the abrasive means receiving surface of said holding means.

9. An apparatus according to claim 1, in which said holding means includes a holding arm having one end provided with a hub for pivotally supporting said holding means.

10. An apparatus according to claim 9, in which at least one portion of said holding arm is substantially straight.

11. An apparatus according to claim 1, in which said holding means comprises an angle lever having one end portion forming said concave surface portion and having its other end portion provided with hub means for pivotally supporting said holding means relative to a chain saw the chain of which is to be sharpened.

12. An apparatus according to claim 1, which includes clamping means supported by said angle lever and located intermediate said end portions.

13. An apparatus according to claim 1, in which said biasing means is formed by a helical pressure spring supported by said holding means.

14. An apparatus according to claim 9, which includes adjustable abutment means associated with said holding means for limiting the pivotal movement of said holding means and thereby of said concave surface portion toward the center of curvature of the latter.

15. An apparatus according to claim 14, in which said abutment means is formed by nut means, and which includes threaded spindle means supported by said holding means and guiding said nut means, plate means connected to said hub and forming an abutment for said nut means.

16. An apparatus according to claim 1, in which said biasing means is formed by a helical torsion spring.

17. An apparatus according to claim 1, in which said concave surface portion for receiving abrasive means extends nearly over an angle of 90°.

18. In combination with a motor chain saw having a driving sprocket wheel and a saw chain adapted to pass over and be driven by said sprocket wheel, an apparatus for sharpening said saw chain which comprises holding means including means detachably connected to said motor chain saw, abrasive foil means supported by said holding means so as to be approximately radially movable toward and away from said sprocket wheel, said abrasive foil means having an abrasive surface concavely curved in conformity with the circumferential surface of said driving sprocket wheel, and bias means biasing said abrasive foil means toward said sprocket wheel and the saw chain portion passing thereover on the outside thereof.

19. An arrangement according to claim 18, in which said holding means is pivotable about an axis substantially parallel to the axis of rotation of said driving sprocket wheel and in spaced relationship thereto.

20. An arrangement according to claim 19, which includes means holding said holding means in nonmovable condition in the axial direction of said driving sprocket wheel relative to the latter.

21. An arrangement according to claim 18, in which said holding means comprises slot means for receiving at least one marginal area of said abrasive foil means, said slot means having portions thereof located outside the region of movement of said driving sprocket wheel and the saw chain moving thereover.

22. An arrangement according to claim 21, in which said slot means include a plurality of slots, at least one of said slots extending in the circumferential direction of the driving sprocket wheel, while transverse slots are respectively provided at both sides of said abrasive foil means in a direction transverse thereto.

23. An arrangement according to claim 18, in which said biasing means is formed by helical torsion spring means, and which includes bearing-sleeve means mounted so as to be rotatable relative to said motor chain saw and carrying said holding means, one end of said helical torsion spring means being connected to said bearing-sleeve means while the other end of said helical torsion spring means is connected to the holding means, said arrangement also including detachable locking means arranged between said bearing-sleeve means and said motor chain saw for selectively locking said bearing-sleeve means in a predetermined position.

24. An arrangement according to claim 23, in which said locking means is formed by a bolt displaceably mounted for movement in axial parallel direction to said bearing-sleeve means, and spring means continuously urging said bolt into locking position, said bearing-sleeve means having at least one locking opening for receiving said bolt.

25. An arrangement according to claim 18, in which said motor chain saw includes housing means, and in which said holding means carrying said abrasive foil means is detachably connnected to said housing means.

26. An arrangement according to claim 18, which includes bearing-block means pivotally supporting said holding means with said abrasive foil means, connecting means detachably connecting said bearing-block means to said motor chain saw, and aligning means aligning said bearing-block means relative to said motor chain saw.

27. An arrangement according to claim 26, in which said bearing-block means includes abutment means for said holding means for limiting the tilting movement of said holding means toward said sprocket wheel means.

28. An arrangement according to claim 26, in which said connecting means is formed by a screw having its axis substantially parallel to the pivot axis of said holding means.

29. An arrangement according to claim 28, in which said motor chain saw includes a housing having a reinforced marginal area located within the region of said screw and provided with a slot open toward the outside and extending transverse to both the pivot axis of said holding means and the longitudinal axis of said screw, said screw extending transversely through said slot beyond opposite sides of said reinforced marginal area of said housing, and nut means threadedly engaging one portion of said screw on one side of said reinforced marginal area, the other portion of said screw on the other side of said reinforced marginal area being engaged by said bearing-block means.

30. An arrangement according to claim 18, which includes bracket means pivotally supporting said holding means, housing means forming part of said motor chain saw, and bolt and nut means in axial alignment with the pivot axis of said holding means and connecting said bracket means to said housing means.

31. An arrangement according to claim 30, in which said bolt means is rotatably journaled in said housing means.